Patented Dec. 29, 1942

2,306,439

UNITED STATES PATENT OFFICE 2,306,439

PROCESS OF PRODUCING CONDENSATION PRODUCTS

Winfrid Hentrich, Dessau-Rosslau, Anhalt, and Erik Schirm, Dessau in Anhalt, Germany, assignors, by mesne assignments, to "Unichem" Chemikalien Handels, A.-G., Zurich, Switzerland, a corporation of Switzerland No Drawing. Application March 25, 1939, Serial No. 264,126. In Germany March 25, 1938

10 Claims. (Cl. 260—248)

This invention relates to certain condensation products of heterocyclic compounds containing at least two —C(halogen)=N— groups in the rings with at least one aromatic amino or one mercapto compound.

One of the principal objects of this invention is to provide industry, particularly the textile, leather and allied branches of industry, with a water-soluble organic treating agent. A special object of the invention is to provide the leather industry with a valuable tanning agent which may be used alone or in combination with other tanning agents.

Another object of the invention is to provide the textile industry with treating agents which are valuable in dyeing operations. Yet another object of the invention is to produce compounds which are useful in the preparation of insecticides such as those used as protection against moths.

According to the present invention commercially valuable products are produced by condensing heterocyclic compounds having at least two —C(halogen)=N— groups with at least one aromatic compound amino or mercapto compound having present one or more acid amide groups, but free of further groups capable of forming azo dyes. The amino or mercapto condensing compound may be used in a quantity to replace all or less than all of the exchangeable halogen atoms present in the heterocyclic ring, and if less is used it is usually desirable to condense the heterocyclic compound further with compounds containing RR'N—, RS—, or RO— groups, the R and R' being hydrogen or a desired hydrocarbon group. The ultimate condensation products in any event must contain one or more water-solubilizing groups, and hence at least one of the groups introduced into the heterocyclic ring must contain one or more of such groups. The condensing compounds used for condensation with the heterocyclic compounds may contain the usual heteroatoms such as halogen, oxygen, sulfur, and nitrogen, or heteroatomic groups containing such atoms.

In accordance with another procedure, the condensation products of the instant invention may be obtained by condensing the halogen-containing heterocyclic compounds in separate steps with the compounds normally obtainable by the splitting of the foregoing condensing compounds instead of with the compounds themselves which procedure is hereinafter more fully disclosed.

The condensations of the present invention take place under mild conditions when the reagents are dissolved in suitable solvents such as acetone and water. The reaction proceeds smoothly especially when such acid-binding agents as sodium acetate, alkali metal or alkaline earth formates, oxides or hydroxides, carbonates, or pyridine, and the like are present. The conversion takes place quantatively in most instances, and the intermediate products as well as the ultimate products are capable of production by commercially feasible methods.

In a preferred embodiment of the invention, 1,3,5-triazines, such as cyanuric halogenides, constitute the heterocyclic raw materials in the condensation process. Other halogen substituted compounds, however, such as those of the diazines, including such compounds as pyrimidine, pyrazine, quinazoline, quinoxaline, phthalazine and the like, also are valuable as raw materials.

The condensation processes of the invention are not limited to compounds having only one heterocyclic ring, for compounds having more than one of such rings likewise comprise suitable raw materials. These multi-ringed compounds may be built up by coupling or bridging together two or more heterocyclic rings through atoms or atomic groups, such as by using cyclic or acyclic diamines. For instance, such compounds can be produced by condensing one mole of a diamine, such as ethylene diamine, phenylene diamine, and the like, with two moles of the heterocyclic compound, such as cyanuric chloride. In this process of condensation, the heterocyclic rings may be partially substituted before the condensation with the previously referred to amino or mercapto compounds containing the acid amide groups. Furthermore, the diamines may themselves contain acid amide groups. For instance, such a compound as N-(3',5'-diamino benzene sulfonyl) sulfanilic acid may be used as the atomic bridge between the two heterocyclic compounds.

In another embodiment of the invention, the heterocyclic compounds containing primary amino groups are coupled together by the use of phosgene.

A wide variety of aromatic amino or mercapto compounds containing one or more acid amide groups may be used as raw materials in the processes of the present invention. These compounds contain such acid amide radicals as —NR.SO$_2$—, —SO$_2$.NR—, —CO.NR—, —NR.CO—, —NR.CO.NR—, where R is hydrogen or any desired hydrocarbon group. These aromatic amino and mercapto compounds may also contain ester-like groups such as —CO.O—, —O.CO—, —SO$_2$.O—, and —O.SO$_2$—. They may likewise contain water-solubilizing groups such as acid radicals of organic and inorganic polybasic acids, quaternary ammonium groups, polyhydroxy, polyether, and polyhydroxy ether groups and the like. Compounds having one or more of the foregoing groups are such compounds as: N-(3'-amino benzene sulfonyl) metanilic acid; N-(3'-methyl amino benzene sulfonyl) sulfanilic acid; 2-(5'-amino naphthalene sulfonyl-1') amino naphthalene 6,8-disulfonic acid; 4''-amino benzyl 3'-amino benzanilide; N-amino benzyl benzene sulfanilide; metanilic acid 4'-sulfo phenyl ester; 4-(4'-amino benzoyl) amino phenol polyglycol ether; 3-(3'-amino benzene sulfamino) benzene sulfamide; 4-(3'-amino 4'-methyl benzene sulfamino) phthalic acid); 3''-amino benzene sulfonyl 3'-amino benzene sulfonyl sulfanilic acid; N-benzene sulfonyl benzidine; 2-amino 4'-benzamino diphenyl; 5-amino 6-(p-toluol sulfamino) naphthalene sulfonic acid-2; 1-(3'-amino benzene sulfamino) benzene 3-trimethyl ammonium chloride, and others.

As hereinbefore stated, it is desirable in some instances to introduce the aromatic amino or mercapto compounds having one or more acid amide groups in steps rather than as a preformed unit. In this stepwise introduction it is usually preferable to admit in succeeding steps those compounds that are normally produced or obtainable on splitting the aromatic amino compounds or the mercapto compounds of the type described. For instance, the halogen containing heterocyclic compounds may be condensed first with compounds which contain besides a reactive hydrogen atom one or more amino, sulfonic acid or carboxyl groups, or, such compounds may be used which contain groups readily convertible into these groups such as nitro groups, acyl amino groups and the like. When the amino, sulfo or corboxyl group are not present themselves they may be introduced by converting the nitro or acyl amino groups and the like which are present into such groups after the initial condensation has taken place. Likewise, water-solubilizing groups may be introduced after the original condensation by subsequent sulfonation, or by subsequent introduction of quaternary ammonium or alkylene oxide groups.

Depending upon the results to be obtained, it is sometimes desirable to replace all of the halogen atoms of the heterocyclic compounds with aromatic amino or aromatic mercapto compounds. For the production of products for use in certain other fields, it often is advantageous to replace only a part of the halogen atoms with these compounds. Under these latter circumstances it is usually preferable to replace the remaining halogen atoms of the heterocyclic compounds with other groups such as RR'N—, RS—, or RO—, in which R and R' are hydrogen or desirable hydrocarbon groups. When compounds containing such groups as RR'N—, RS—, or RO— have R and R' representing desirable hydrocarbon groups, they include such compounds as: alkyl amines, aniline, toluidine, cyclohexyl amine, alkylated cyclohexyl amine, benzyl amine, phenol, alkyl phenols, alkyl mercaptans, thio phenols, nuclear halogenated or nuclear alkylated thio phenols and the like. These compounds may also contain water-solubilizing groups such as, for instance, groups from polybasic inorganic and organic acids forming acid salts, quaternary ammonium groups, polyhydroxy, polyether or polyhydroxy ether groups, and the like. For instance, taurine, glycocoll, sulfanilic acid, thioglycollic acid, m-amino phenyl trimethyl ammonium chloride, glucamine, p-amino phenol polyglycol ether, and the like provide these desirable water-solubilizing groups.

When the radicals RR'N—, RS— and RO— to be substituted for remaining halogen atoms have R and R' representing hydrogen instead of hydrocarbon groups, such radicals may be introduced through the aid of any one of a number of alkaline reagents thereby introducing hydroxy, amino or mercapto groups. These alkaline agents include ammonia, sodium carbonate, caustic soda, sulfur alkalies and the like. Reactions involving these alkaline reagents often produce especially valuable reaction products when the heterocyclic compounds contain as many as three replaceable halogen atoms.

It should be understood that the processes of the present invention are not to be confused with the processes whereby amino compounds having one NH.CO group and one or more groups capable of forming azo dyes are condensed with cyanuric chloride and further condensed to produce azo dyes. In the processes of the present invention, the raw materials and the ultimate products are different from those of the prior processes and are not suited for the production of azo dyes.

The compounds of the present invention are readily soluble in water, forming colloidal, aqueous solutions. They may be used exclusively or in combination with other tanning agents for the purpose of tanning hides. They may also be used as precipitates for basic dyes in patent leather dyeing or for protection of animal fibers in substantive dye operations. Many of the compounds also have surprising effective insecticidal qualities and, therefore, find utility in the preparation of various insecticides. For instance, when they are applied to fibers of various sorts they act as a protection against moths.

The following examples, in which the quantities are expressed in parts by weight, will serve to illustrate the processes of the present invention, the products resulting therefrom and the utilities of such products.

*Example 1*

One hundred and eighty five parts of cyanuric chloride are brought into a finely divided suspension by dissolving the same in slightly warmed acetone and by stirring the resulting solution in 5000 parts of ice water. A solution of 700 parts of the sodium salt of the 4-(3'-amino benzene sulfamino) benzene sulfonic acid in 2400 parts of water is added to the suspension and the temperature is allowed to rise gradually to 50° C. The cyanuric chloride dissolves very rapidly producing a solution, strongly acid to congo paper, to which 300 parts of crystalline sodium acetate is added. The solution, which is now neutral to congo paper, is allowed to stand for one to two hours. After this time, unchanged amino phenyl sulfonyl sulfanilic acid should not be present at all or only in traces. Now 100 parts of aniline and 150 parts of crystalline sodium acetate are added and the mass heated to 90° to 100° C. and stirred at this temperature for about one to two hours until aniline ceases to be absorbed into the heterocyclic molecule. The solution is then neutralized with caustic soda and thereafter sodium carbonate is added until there is a distinct alkaline reaction to litmus, and any excess aniline is distilled off with water vapor. By adding one-fourth as many parts by weight of sodium chloride as the fluid has parts by volume and cooling in ice a quantitative yield of the condensation product will be precipitated out in an easily filterable form. The condensation product has the following structural formula:

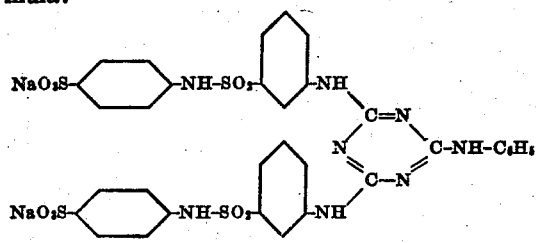

After drying at a temperature of 100° C., it forms an amorphous light-grey yellowish powder which is easily soluble in water. The aqueous solution fluoresces neither in ordinary nor ultra-violet light. Upon cooling, a hot concentrated solution of the compound separates out in the form of a stiff, unfilterable gel.

In the process of this example, if after the exchange of the first two chlorine atoms of the cyanuric chloride by two groups from the amino benzene sulfonyl sulfanilic acid, the third chlorine atom is replaced by reacting with sodium bicarbonate instead of adding aniline and more sodium acetate, and the solution is then heated to boiling and enough caustic soda added to make the hot solution weakly alkaline to phenolphthalein, a product which contains a hydroxyl group instead of the aniline group will be obtained from the solution after it has stood for half an hour. Compare the above formula with an —OH group replacing the —NH—C₆H₅ group. This product is considerably more soluble than that obtained in the first reaction and cannot be precipitated from its aqueous solution quantitatively with sodium chloride. When this product is used as a tanning agent, it is advisable to bring about the desired pH value after cooling the solution by adding a suitable acid and then using the solution directly.

*Example 2*

One hundred and eighty five parts of cyanuric chloride are suspended, as in the preceding example, in 5000 parts of ice water. A concentrated aqueous solution of 1366 parts of the sodium salt of the 4-[3'-(amino benzyl amino)-benzene sulfamino]-benzene sulfonic acid of the following formula:

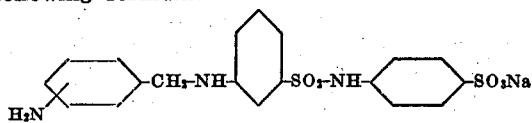

is added during a period of half an hour, at room temperature. After stirring a clear solution is obtained to which 600 parts of crystallized sodium acetate are added and then the solution is heated gradually to 90° C. and maintained at this temperature until free amino compounds are no longer traceable. The resulting condensation product can be obtained in a solid form by salting out as in Example 1. On the other hand, the resulting solution may be used directly for tanning purposes provided the solution is first adjusted to a suitable pH value.

*Example 3*

Two hundred and eight parts of 4-methyl 2,6-dichlor 5-nitro pyrimidine are dissolved by mildly heating in the minimal quantity of acetone and the solution is poured into 5000 parts of ice water. To the suspension obtained a concentrated aqueous solution of 1100 parts of the di-sodium salt of the 1-(5' amino naphthalene sulfonyl 1')amino naphthalene 3,6-di-sulfonic acid of the following formula:

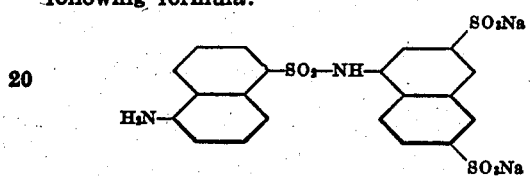

is added. Thereafter 300 parts of crystalline sodium acetate are added and the solution heated for about two hours to a temperature of 90° to 100° C. and maintained at this temperature until a small portion of the solution gives a negative reaction to a test for a capacity for further diazotizing. The resulting solution may either have the condensation product salted out or it may be so modified as to be suitable for direct use in tanning.

*Example 4*

A concentrated solution of 185 parts of cyanuric chloride in acetone or alcohol is poured, while being stirred vigorously, into 5000 parts of ice water. One hundred and forty parts of N-methyl taurine are added under continued stirring until a clear solution is obtained. Then the solution is carefully neutralized with sodium bicarbonate and a solution of 322 parts of 2-hydroxy 3-methyl 5-(3'-amino benzol sulfonyl amino) benzoic acid and 40 parts of sodium hydroxide in 5000 parts of water are added. The resulting solution is stirred for an hour at room temperature, and then heated slowly to 90° C. while carefully adding sodium bicarbonate to keep the reaction solution only slightly acid to litmus. On the completion of the conversion at a temperature of 90° C., 2000 parts of sodium chloride are added and the solution is allowed to cool while being stirred. The resulting precipitate is filtered and dried.

An equivalent molecular quantity of 2,4-dichlorquinazoline may be used advantageously in place of the cyanuric chloride.

*Example 5*

A concentrated aqueous solution of 297 parts of the disodium salt of the aniline 2,5-disulfonic acid are added to a finely divided suspension of 185 parts of cyanuric chloride in 5000 parts of ice water, prepared as in Example 1, and after the suspension has been transformed into a solution at a temperature of 20° C., a solution of 403.5 parts of 3-(3'-amino benzene sulfamino) benzene sulfanilide, containing a minimal amount of diluted caustic soda for neutralization, is added under vigorous stirring. Stirring is continued at a temperature of 50° C., while maintaining a slightly acid reaction to litmus by carefully adding sodium bicarbonate, until traces of free amino compounds are no longer present; then 159 parts of the sodium salt of dry m-amino benzoic acid are introduced and the temperature is gradually raised to 90° C. The reaction solution is kept slightly acid to litmus and the stirring is continued until the conversion is completed. Finally sodium carbonate is added until the solution is slightly alkaline; then the condensation product is salted out, filtered and dried.

Example 6

A concentrated aqueous solution of 225 parts of disodium salt of the 4-amino phthalic acid are added to a finely divided suspension of 185 parts of cyanuric chloride in 5000 parts of ice water, prepared in accordance with Example 1, and stirred until the amino phthalic acid group is bound to the heterocyclic radical. The temperature is allowed to rise to about 40° C. and an aqueous solution of 314 parts of the sodium salt of the 3-(3'-amino benzene sulfamino) benzoic acid is added. The reaction is kept slightly acid to litmus by adding sodium bicarbonate, until the second phase of the condensation is completed. Then 200 parts of 25% solution of ammonium hydroxide are added to this solution and the temperature is raised within an hour to 90° C. where stirring is continued for one to two hours. The condensation product is salted out, filtered and dried.

Example 7

One hundred and sixty five parts of 2-amino 4,6-dichlor 1,3,5-triazine are converted into a finely divided suspension by dissolving in a minimal amount of acetone or alcohol and stirring the solution in 5000 parts of ice water. A concentrated aqueous solution of 200.5 parts of amino benzyl trimethyl ammonium chloride (obtained by nitrating benzyl chloride, treating the mixture of the isomeric nitro benzyl chlorides with trimethyl amine and reducing the nitro group with iron and a little acetic acid) is added to the foregoing suspension whereupon it very rapidly dissolves. Three hundred parts of crystalline sodium acetate are added then while stirring vigorously an alcoholic solution of 150 parts of p-amino acetanilide are added slowly and the temperature raised to 90° C. where heating is continued until the p-amino acetanilide has disappeared. The condensation product is salted out and filtered off when cold. The residue is then boiled with a 25% sulfuric acid solution until the acetyl group is split off. This solution is neutralized with slaked lime or calcium carbonate and filtered hot, thoroughly washing off the gypsum with hot water. The filtrate is concentrated and treated with 150 parts of calcium carbonate and a solution of 190 parts of p-toluol sulfo chloride in an equal quantity of acetone is stirred in at a temperature of 20-25° C. The solution is gradually heated to a temperature of 90° to 95° C. and stirred until the sulfo chloride is converted. Then the excess calcium carbonate is filtered off while the solution is hot. The condensation product is salted out and filtered off when the solution has cooled. The condensation has the following structural formula:

Example 8

One hundred and thirty nine parts of m-nitro phenol are heated with 2000 parts of toluol and 5 parts of sodium ethylate in an autoclave to a temperature of 100° C. and 880 parts of ethylene oxide are introduced under pressure at a temperature of 100° to 120° C. The ethylene oxide is added gradually as the reaction progresses and the reaction conditions are maintained until a decrease in pressure indicates the completion of the reaction. Then the toluol is distilled off and the residue reduced in an aqueous solution, in the customary manner, with iron and a little acetic acid. The solution is made alkaline by adding sodium carbonate and freed from iron by filtration. The solution, now containing a polyglycol ether of the m-amino phenol of the general formula

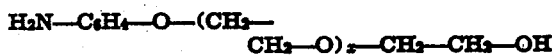

is made exactly neutral to litmus by adding hydrochloric acid, then the solution in accordance with the usual practice, is added at 5° C., to a finely divided suspension of 185 parts of cyanuric chloride in 5000 parts of water. After the cyanuric chloride is dissolved, a solution of 298 parts of metanilic acid 1'-naphthalide in alcohol or acetone is added while raising the temperature to 20° C.; then 300 parts of crystalline sodium acetate are added and the suspension is stirred at 45° C. until the naphthalide is dissolved. Finally 129 parts of n-octyl amine and 300 parts of crystalline sodium acetate are added and the solution stirred at a temperature of 90° to 100° C. until the amine has disappeared. The reaction product may be separated in the same manner as in the previous examples.

Example 9

A cold solution of 350 parts of the sodium salt of the 4-(3'-amino benzene sulfamino) benzene sulfonic acid is added to a finely divided suspension of 185 parts of cyanuric chloride, prepared in accordance with Example 1, and stirred until the cyanuric chloride is dissolved. The solution is carefully neutralized with sodium bicarbonate at a temperature of 3° to 5° C. and a concentrated aqueous solution of 186 parts of the disodium salt of the beta-mercapto ethane sulfonic acid is added at a temperature not above +5° C. within a period of one to two hours. After the conversion is complete, the solution is heated to 20° C. and an alcoholic solution of 92 parts of diphenyl-diamine are added in small quantities gradually, then 300 parts of crystalline sodium acetate are added and the temperature is raised to 90° C. where heating is continued until the diphenyl-diamine is bound to the tricyano radical. The reaction mixture is worked up in the customary manner by salting out, filtering and

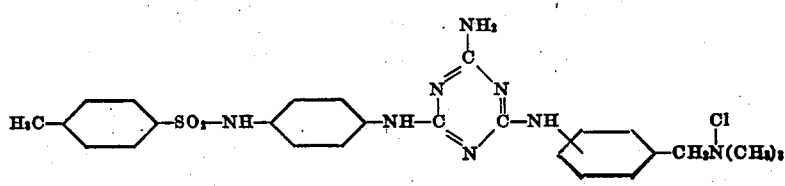

drying. The structural formula of the condensation product obtained is as follows:

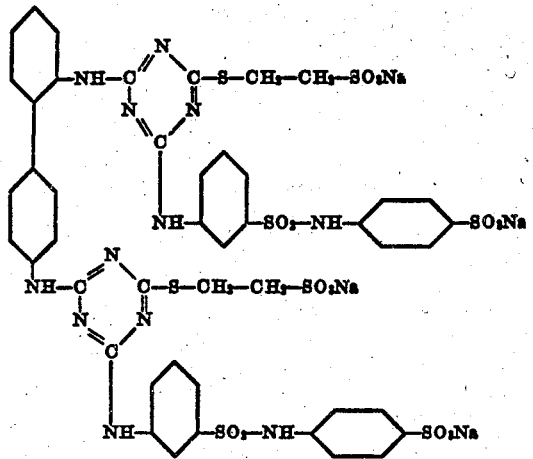

*Example 10*

The condensation product of one mole of cyanuric chloride and two moles of m'-amino benzene sulfonyl sulfanilic acid is prepared as in Example 1. Then 150 parts of m-amino acetanilide and 300 parts of crystalline sodium acetate are added and stirring continued at a temperature of 90° to 100° C. until the amino acetanilide has disappeared. The liquid is made distinctly alkaline by adding sodium carbonate and stirring is continued at a temperature of 90° to 100° C. until the alkaline reaction to litmus remains for at least half an hour and until the diazotization value of the solution at least does not increase. The solution is made slightly acid to litmus by carefully adding hydrochloric acid and then it is cooled off to room temperature and phosgene is introduced until a test indicates that urea is no longer being formed. The condensation product obtained is then isolated in the customary manner by salting out, filtering and drying.

*Example 11*

A cold solution of 350 parts of the sodium salt of N-(m'-amino benzene sulfonyl) sulfanilic acid in 1200 parts of water is added to a finely divided suspension of 185 parts of cyanuric chloride in 5000 parts of ice water and stirred until the cyanuric chloride is dissolved. Then a concentrated aqueous solution of 183 parts of the sodium salt of the N-(3',5'-diamino benzene sulfonyl) sulfanilic acid as well as 300 parts of crystalline sodium acetate is added and the temperature allowed to rise to 45° C. where stirring is continued at a temperature of 45° to 50° C. until free amino groups are no longer present. The solution is heated to boiling and sodium carbonate is added until the alkaline reaction remains even after lengthy boiling. The product is worked up in the same manner as heretofore and has the following structural formula:

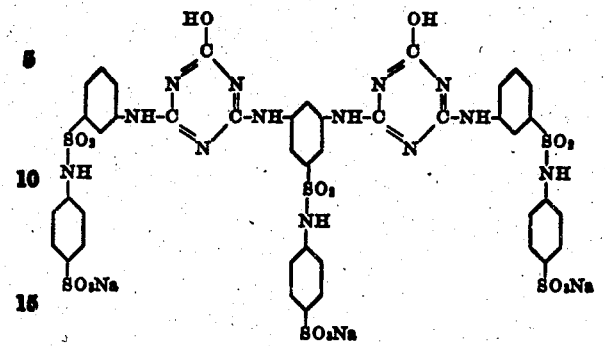

It should be understood that the present invention is not limited to the specific processes, compounds, and compositions herein disclosed but that it extends to all equivalent compounds, compositions, and processes which one skilled in the art would consider within the scope of the appended claims.

*Example 12*

1449 parts of metanilyle-metanilyle-sulfanilic acid of the formula

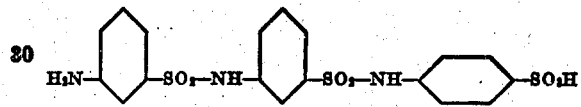

are dissolved in 6000 parts of water under addition of 120 parts of sodium hydroxide. The solution is cooled down to +2° C. and 185 parts of finely powdered cyanuric chloride are given in. The mixture is stirred slowly increasing the temperature and is neutralized by slowly adding sodium bicarbonate and finally sodium carbonate. The conversion is finished if the alkaline reaction remains stable during 1-2 hours at a temperature of 90-95° C.

The thus formed clear brownish solution is cooled down at nearly 70° C. and is acidified with concentrated hydrochloric acid until Congo paper is dyed blue. The condensation product is precipitated by the mineral acid in the form of a plastic resin. The condensation product solidifies while cooling and may easily be powdered, filtered and dried. The reaction product is a redish-white powder easily soluble in water.

*Example 13*

At a finely divided and strongly stirred suspension of 185 parts of cyanuric chloride in 5000 parts ice water a concentrated aqueous solution of 349 parts of the disodium salt of the N,N'-di-metanilyle-benzidine-2,2'-di-sulfonic acid of the formula

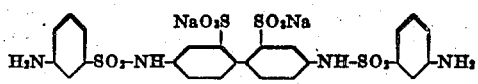

is slowly added. The stirring is continued until the cyanuric chloride is dissolved. Then a solution of 966 parts of metanilyle-sulfanilic acid and 80 parts of sodium hydroxide in 4000 parts of water is rapidly added and the temperature is allowed to rise up to 20° C. The reaction mixture is carefully neutralised with sodium bicarbonate and finally with sodium carbonate while heating at a temperature of 90-95° C. The precipitation of the condensation product, containing two cyanuric nucleus in the molecule, with acid and the working up of the reaction product is performed according to the process described in Example 12.

Example 14

501 parts of p-acetaminothiophenol are dissolved in 2500 parts of ethyl alcohol. The solution is cooled down to +2° C. and a solution of 69 parts of sodium in 1500 parts of ethyl alcohol is added. Hereafter a solution of 185 parts of cyanuric chloride in 740 parts of toluene is added and the mixture is stirred until the alkaline reaction is disappeared and the conversion is finished. Now 2000 parts of 38% hydrochloric acid is added and the mixture is heated under reflux until the saponification of the acetamino group is finished. One cools down, filters the precipitation and washes with water. For forming the free base the reaction product is treated with diluted soda lye, is washed with water and dried. The base has the following formula:

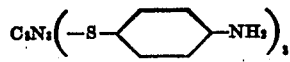

450 parts of this base are suspended in 5000 parts of ethyl alcohol. To the suspension 600 parts of crystallized sodium acetate and 662 parts of benzoic acid-m-sulfochloride are added under good stirring. The mixture is warmed to 40° C., made alkaline by addition of sodium carbonate and finally heated under reflux. The reaction is finished as soon as the amino groups are disappeared. The alcohol is distilled off, not dissolved parts are filtered and the condensation product is precipitated in the filtrate with hydrochloric acid. The precipitate is filtered and dried. The thus obtained reaction product is a nearly colourless powder which is easily soluble in water in the presence of sodium acetate or alkalies.

Example 15

To a finely divided suspension of 185 parts of cyanuric chloride in 5000 parts of ice water under vigorous stirring at 2–5° a solution of 966 parts of metanilyle-metanilyle-sulfanilic acid and 80 parts of sodium hydroxide in 2000 parts of water is added. The cyanuric chloride dissolves rapidly. Hereafter one neutralizes with sodium bicarbonate while slowly warming at 40° C. After the amino groups are disappeared an aqueous solution of 54 parts of m-phenylenediamine is added. Now at a temperature of 90° C. the formed acid is neutralized with sodium carbonate and finally a week alkaline reaction is made. The conversion is finished if the alkaline reaction is stable for a longer time. The reaction mixture is worked up according to Example 12.

One obtains a condensation product of similar qualities if the m-phenylendiamine in this example is substituted by 64 parts of 2,4,2',4-tetramino-5,5'-ditolylmethane.

The compounds of the prescribed invention containing as acid amide groups carbon amide groups (—CO.NH—) only are useful in textile treating processes. The tanning qualities of these compounds however are small. Whereas the compounds having sulfamide (—SO₂.NH—) groups appropriately at least three sulfamide (—SO₂.NH—) groups in the molecule are of an excellent tanning action.

We claim:

1. A new compound composed of a tricyano group having linked to each of the carbon atoms of the cyano group the radical derived from metanilyle-metanilyle-sulfanilic acid, said radical being linked through an amino nitrogen atom.

2. A new compound composed of two tricyano groups, a carbon atom of one tricyano group being linked to a carbon atom of the other tricyano group through a m-phenylene diamine radical, wherein the remaining carbon atoms of the tricyano groups are substituted by the radical derived from metanilyle-metanilyle-metanilic acid, said radical being linked through an amino nitrogen atom.

3. A new tanning agent free of azo groups, a compound consisting of a single azine nucleus containing from two to three —C(X)=N— groups as a part of the ring, wherein at least one X is selected from the group consisting of amino- and mercapto-aryl-sulfonamide-aryl radicals respectively connected to the azine ring through the amino nitrogen and mercapto sulfur atoms, the aryl group containing not more than two rings; the remaining X's being selected from the group consisting of halogen,

S—R, and O—R radicals, where the R's are selected from a member of the group consisting of hydrogen and hydrocarbon groups; said compound containing at least three sulfonamide linkages and at least one water-solubilizing group in addition to the sulfonamide linkages.

4. A new tanning agent free of azo groups, a compound selected from the group of compounds consisting of (1) a single azine nucleus containing from two to three —C(X)=N— groups as part of the ring and (2) a double azine nucleus, each azine ring of which contains one

group and from one to two —C(X)=N— groups as part of the ring said azine rings being joined through a polyamine radical the amino nitrogens of which are connected to the carbon atoms of the

groups of the rings wherein at least one X is selected from the group consisting of amino- and mercapto-aryl-sulfonamide-aryl radicals respectively connected to the azine ring through the amino nitrogen and mercapto sulfur atoms, the aryl group containing not more than two rings; the remaining X's being selected from the group consisting of halogen,

S—R, and O—R radicals, where the R's are selected from a member of the group consisting of hydrogen and hydrocarbon groups; said compound containing at least three sulfonamide linkages and at least one water-solubilizing group in addition to the sulfonamide linkages.

5. A new tanning agent free of azo groups, a compound consisting of a single azine nucleus containing three —C(X)=N— groups as a part of the ring, wherein each X is selected from the group consisting of amino- and mercapto-aryl-sulfonamide-aryl radicals respectively connected to the azine ring through the amino nitrogen and mercapto sulfur atoms, the aryl group being a benzene nucleus; said compound containing at least three sulfonamide linkages and at least one water-solubilizing group in addition to the sulfonamide linkages.

6. A new tanning agent free of azo groups, a compound consisting of a single azine nucleus containing three —C(X)=N— groups as part of the ring wherein each X is a mercapto-aryl-sulfonamide-aryl-COOH radical connected to the azine ring through the mercapto sulfur atom, the aryl group being a benzene nucleus.

7. A new tanning agent free of azo groups, a compound consisting of a single azine nucleus containing three —C(X)=N— groups as part of the ring wherein at least one X is selected from the group consisting of amino- and mercapto-aryl-sulfonamide-aryl radicals respectively connected to the azine ring through the amino nitrogen and mercapto sulfur atoms, the aryl group containing not more than two rings; the remaining X's being selected from the group consisting of halogen,

S—R, and O—R radicals, where the R's are selected from a member of the group consisting of hydrogen and hydrocarbon groups; said compound containing at least three sulfonamide linkages and at least one water-solubilizing group in addition to the sulfonamide linkages.

8. A new tanning agent free of azo groups, a compound consisting of a double azine nucleus, each azine ring of which contains one

group, and two —C(X)=N— groups as part of the ring, said azine rings being joined through a diamine radical the amino nitrogens of which are connected to the carbon atoms of the

groups of the rings wherein at least one X is selected from the group consisting of amino- and mercapto-aryl-sulfonamide-aryl radicals respectively connected to the azine ring through the amino nitrogen and mercapto sulfur atoms, the aryl group containing not more than two rings; the remaining X's being selected from the group consisting of halogen,

S—R, and O—R radicals, where the R's are selected from a member of the group consisting of hydrogen and hydrocarbon groups; said compound containing at least three sulfonamide linkages and at least one water-solubilizing group in addition to the sulfonamide linkages.

9. A new tanning agent free of azo groups, a compound consisting of a double azine nucleus, each azine ring of which contains one

group, and two —C(X)=N— groups as part of the ring, said azine rings being joined through a diamine radical the amino nitrogens of which are connected to the carbon atoms of the

groups of the rings wherein each X is selected from the group consisting of amino- and mercapto-aryl-sulfonamide-aryl radicals respectively connected to the azine ring through the amino nitrogen and mercapto sulfur atoms, the aryl group containing not more than two rings; said compound containing at least three sulfonamide linkages and at least one water-solubilizing group in addition to the sulfonamide linkages.

10. A new tanning agent free of azo groups, a compound consisting of a double azine nucleus, each azine ring of which contains one

group, and from one to two —C(X)=N— groups as part of the ring, said azine rings being joined through an arylene-diamine radical the amino nitrogens of which are connected to the carbon atoms of the

groups of the rings wherein at least one X is selected from the group consisting of amino- and mercapto-aryl-sulfonamide-aryl radicals respectively connected to the azine ring through the amino nitrogen and mercapto sulfur atoms, the aryl group containing not more than two rings; the remaining X's being selected from the group consisting of halogen,

S—R, and O—R radicals, where the R's are selected from a member of the group consisting of hydrogen and hydrocarbon groups; said compound containing at least three sulfonamide linkages and at least one water-solubilizing group in addition to the sulfonamide linkages.

WINFRID HENTRICH.
ERIK SCHIRM.